US008746446B2

(12) United States Patent
Chiang

(10) Patent No.: US 8,746,446 B2
(45) Date of Patent: Jun. 10, 2014

(54) PROTECTIVE COVER

(75) Inventor: Meng-Sheng Chiang, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 155 days.

(21) Appl. No.: 13/309,539

(22) Filed: Dec. 1, 2011

(65) Prior Publication Data
US 2013/0140203 A1 Jun. 6, 2013

(51) Int. Cl.
*B65D 85/00* (2006.01)

(52) U.S. Cl.
USPC ......................................... 206/320; 206/45.23

(58) Field of Classification Search
CPC ........... A45C 2013/025; A45C 13/069; A45C 2011/003; A45C 9/00; B65D 2313/04; B65D 5/5206; G06F 1/1628; G06F 1/1613
USPC .................. 206/320, 45.2, 45.23, 45.24, 818; 361/679.3
See application file for complete search history.

(56) References Cited

U.S. PATENT DOCUMENTS

| 2,175,327 | A | 10/1939 | Thornhill et al. | |
| 5,445,251 | A | 8/1995 | Redwood | |
| 5,607,054 | A * | 3/1997 | Hollingsworth | 206/320 |
| 5,887,723 | A * | 3/1999 | Myles et al. | 206/760 |
| D496,792 | S | 10/2004 | Crites | |
| D544,922 | S | 6/2007 | Shaffer | |
| 7,545,634 | B2 * | 6/2009 | Simonian et al. | 361/679.55 |
| D600,699 | S | 9/2009 | Johnston et al. | |
| D607,035 | S | 12/2009 | Adams et al. | |
| 8,143,982 | B1 * | 3/2012 | Lauder et al. | 335/219 |
| D658,187 | S | 4/2012 | Diebel | |
| D658,188 | S | 4/2012 | Diebel | |
| D660,592 | S | 5/2012 | Mecchella | |
| 8,186,508 | B2 * | 5/2012 | Fan | 206/320 |
| 8,253,518 | B2 * | 8/2012 | Lauder et al. | 335/219 |
| 8,264,310 | B2 * | 9/2012 | Lauder et al. | 335/219 |
| D672,146 | S | 12/2012 | Fathollahi | |

(Continued)

FOREIGN PATENT DOCUMENTS

JP   D1416392   6/2011
TW   D150510    12/2012

OTHER PUBLICATIONS

"Office Action of Taiwan counterpart application No. 101303131" issued on Jan. 10, 2013, p. 1-p. 3, in which the listed references were cited.
"Office Action of Taiwan counterpart application No. 101303131U01" issued on Jan. 10, 2013, p. 1-p. 3, in which the listed references were cited.
"Notice of Allowance of counterpart U.S. Appl. No. 29/416,513" issued on Aug. 2, 2013, p. 1-p. 14, in which the listed references were cited.

Primary Examiner — Steven A. Reynolds
(74) Attorney, Agent, or Firm — Jianq Chyun IP Office

(57) ABSTRACT

A protective cover applying to cover or support a tablet computer is provided. The protective cover has a first covering part, a second covering part, a third covering part, a first magnetic element, a second magnetic element, and a third magnetic element. The first covering part has a first connecting lateral, a second connecting lateral and a plurality of first hard domains, and adjacent first hard domains are connected to each other flexibly. The second covering part is connected to the first connecting lateral flexibly and has a plurality of second hard domains, and adjacent second hard domains are connected to each other flexibly. The third covering part is connected to the second connecting lateral flexibly. The first magnetic element is disposed at the first covering part. The second magnetic element is disposed at the second covering part. The third magnetic element is disposed at the third covering part.

22 Claims, 11 Drawing Sheets

(56) References Cited

U.S. PATENT DOCUMENTS

| | | |
|---|---|---|
| 8,328,008 B2 | 12/2012 | Diebel et al. |
| D674,016 S | 1/2013 | Letterle |
| D677,668 S | 3/2013 | Phillips et al. |
| 8,424,829 B2 * | 4/2013 | Lu et al. .......... 248/371 |
| 8,434,601 B2 * | 5/2013 | Hou et al. .......... 190/1 |
| D685,803 S | 7/2013 | Akana et al. |
| 2005/0247584 A1 * | 11/2005 | Lu .......... 206/320 |
| 2008/0302687 A1 * | 12/2008 | Sirichai et al. .......... 206/320 |
| 2009/0159763 A1 | 6/2009 | Kim |
| 2011/0163642 A1 | 7/2011 | Rohrbach et al. |
| 2012/0300383 A1 * | 11/2012 | Lauder et al. .......... 361/679.26 |

* cited by examiner

PROTECTIVE COVER

BACKGROUND OF THE INVENTION

1. Field of the Invention

The present invention relates to a protective cover, in particular, to a protective cover applying to cover or support a tablet device.

2. Description of Related Art

With rapid development of science and technology, portable electronic devices are more and more diversified, such as, a tablet device. The tablet device is portable for users. However, when being carried, the tablet device easily gets bumped, and as a result, the tablet device is damaged or a casing thereof gets abraded. In order to reduce the above situations, various types of protective covers are available in the market, for example, a protective cover of a foam material or a hard shell protective cover. Taking the protective cover of foam material for example, the foam has a shock absorption feature, so damage on the tablet device caused by shocks can be reduced. The hard shell protective cover can reduce influences of external impact on the tablet device.

In addition, when being used, the tablet device is usually disposed on a support having a slant angle, so as to facilitate viewing and operating of the user. Therefore, in addition to purchasing the protective cover, the user of the tablet device may also purchase the support for use convenience.

However, to achieve the above objective, the user not only needs to purchase a series of peripheral products that cost a lot of money, but also needs to carry the peripheral products while carrying the tablet device, which adds the burden of the user.

SUMMARY OF THE INVENTION

Accordingly, the present invention is directed to a protective cover applicable to covering a tablet device, so as to reduce an influence of external impact on the tablet device.

The present invention provides a protective cover, which can support a tablet device to facilitate operation of a user.

The present invention provides a protective cover, applying to cover or support a tablet device. The protective cover includes a first covering part, a second covering part, a third covering part, a first magnetic element, a second magnetic element, and a third magnetic element. The first covering part has a first connecting lateral and a second connecting lateral that are opposite to each other, and a plurality of first hard domains, in which adjacent first hard domains are connected to each other flexibly. The second covering part is connected to the first connecting lateral flexibly and has a plurality of second hard domains, and adjacent second hard domains are connected to each other flexibly. The third covering part is connected to the second connecting lateral flexibly. The first magnetic element is disposed at the first covering part. The second magnetic element is disposed at the second covering part. The third magnetic element is disposed at the third covering part. When the second covering part covers the tablet device on the first covering part and the third covering part covers the second covering part, the first covering part and the second covering part form a space to receive the tablet device, and the third magnetic element and the first magnetic element attract each other. When the second hard domain and the first hard domain are winded into a hollow polygonal column, the first magnetic element and the second magnetic element attract each other, and a surface of the hollow polygonal column forms a bearing surface to support the tablet device.

The present invention further provides a protective cover, applying to cover or support a tablet device. The protective cover includes a first covering part, a second covering part, a third covering part, a first magnetic element, a second magnetic element, and a third magnetic element. The first covering part has a first connecting lateral and a second connecting lateral that are opposite to each other, and a plurality of first hard domains, in which adjacent first hard domains are connected to each other flexibly. The second covering part is connected to the first connecting lateral flexibly. The third covering part is connected to the second connecting lateral flexibly. The first magnetic element is disposed at the second covering part. The second magnetic element is disposed at the second covering part. The third magnetic element is disposed at the third covering part. When the second covering part covers the tablet device on the first covering part and the third covering part covers the second covering part, a space exists between the first covering part and the second covering part to receive the tablet device, in which the third magnetic element and the second magnetic element attract each other. When the third covering part and the first hard domain are winded into a hollow polygonal column, the third magnetic element and the first magnetic element attract each other, and a surface of the hollow polygonal column forms a bearing surface to support the tablet device.

Based on the above, the protective cover according to the present invention can provide efficacies of covering and protecting the tablet device, and can be easily transformed to a support to support the tablet device. The protective cover according to the present invention has advantages of easy operation and reducing the weight and size of articles carried by the user.

To make the above characteristics and advantages of the utility model easy to understand, the embodiments will be described in detail hereinafter with reference to the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
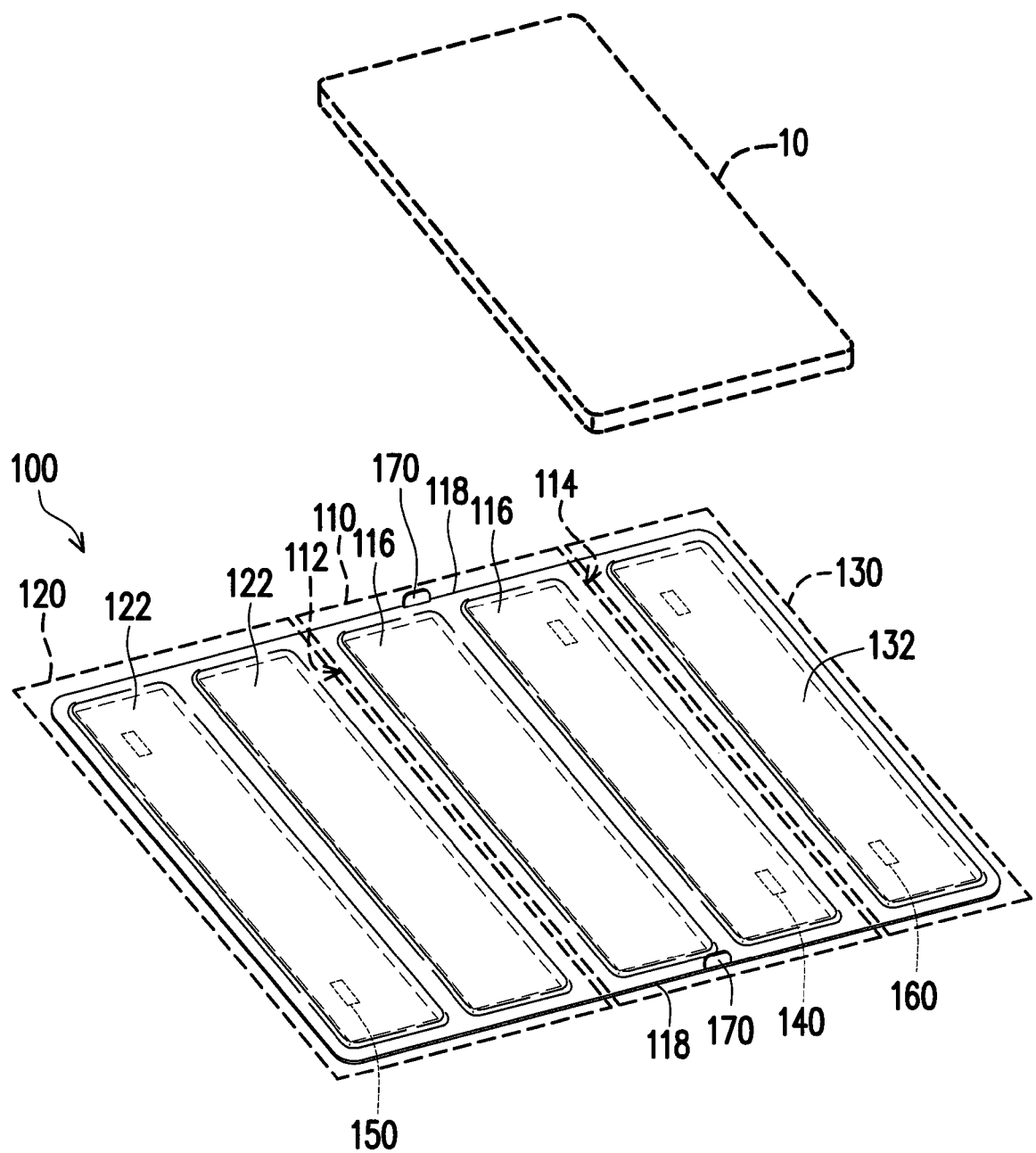
FIG. 1A to FIG. 1D are schematic three-dimensional top views of different states of a protective cover according to a first embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1A to FIG. 1D are schematic three-dimensional top views of different states of a protective cover according to a first embodiment of the present invention. FIG. 1E is a schematic side view of a protective cover of FIG. 1A covering a tablet device. Referring to FIG. 1A, this embodiment provides a protective cover 100, applying to cover or support a tablet device 10. The protective cover 100 includes a first covering part 110, a second covering part 120, a third covering part 130, a first magnetic element 140, a second magnetic element 150, and a third magnetic element 160.

The first covering part 110 has a first connecting lateral 112 and a second connecting lateral 114 that are opposite to each other, and a plurality of first hard domains 116, in which adjacent first hard domains 116 are connected to each other flexibly. The second covering part 120 is connected to the first connecting lateral 112 flexibly and has a plurality of second hard domains 122, in which adjacent second hard domains 122 are connected to each other flexibly. The third covering part 130 is connected to the second connecting lateral 114 flexibly. The first magnetic element 140 is disposed at the first covering part 110. The second magnetic element 150 is disposed at the second covering part 120. The third magnetic element 160 is disposed at the third covering part 130.

In this embodiment, the first covering part 110 has two first hard domains 116, and the second covering part 120 has two second hard domains 122. However, the number of the first hard domain 116 and the second hard domain 122 is not limited thereto. The third covering part 130 has a third hard domain 132, and the first hard domain 116, the second hard domain 122 and the third hard domain 132 have the same width.

In this embodiment, the first covering part 110 has a pair of first profile laterals 118 opposite to each other. A plurality of barriers 170 is disposed at the pair of first profile laterals 118, so that when the tablet device 10 is covered by the protective cover 100, the tablet device 10 can be maintained in a space 180 between the first covering part 110 and the second covering part 120.

Figure 1B:
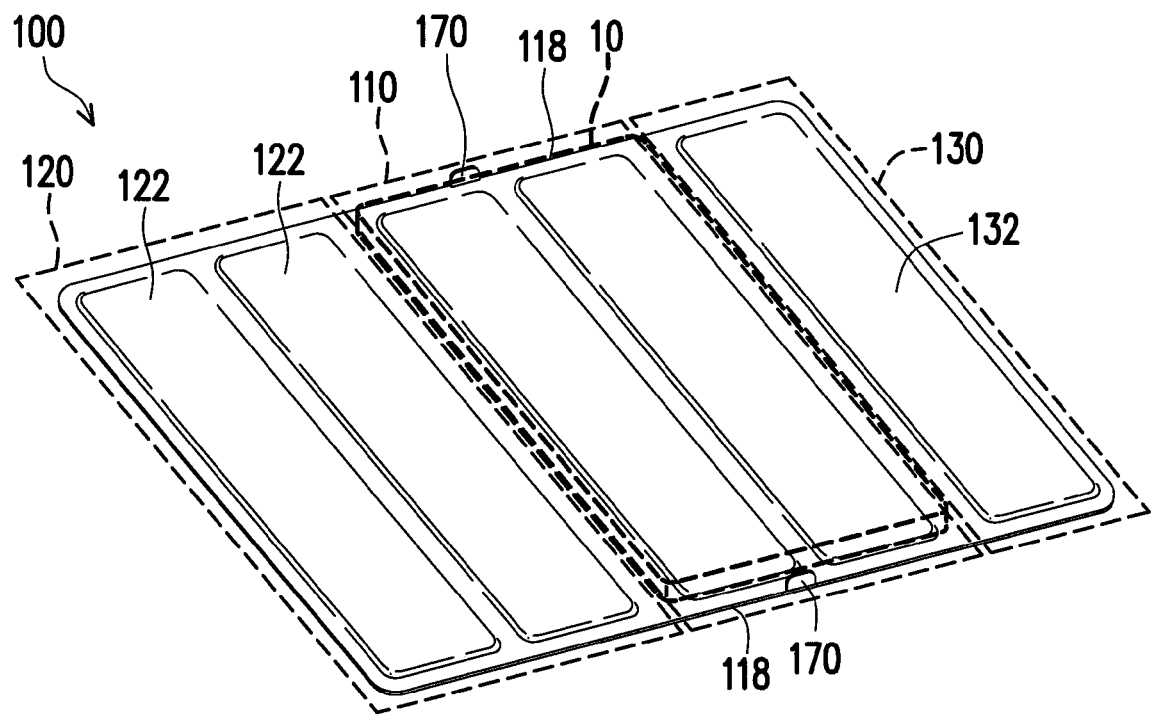
Figure 1C:
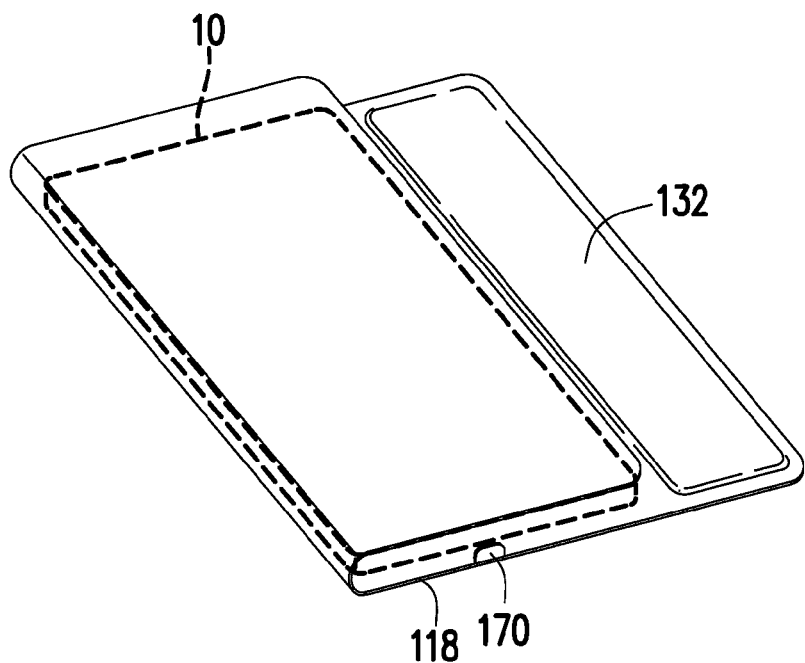
Figure 1D:
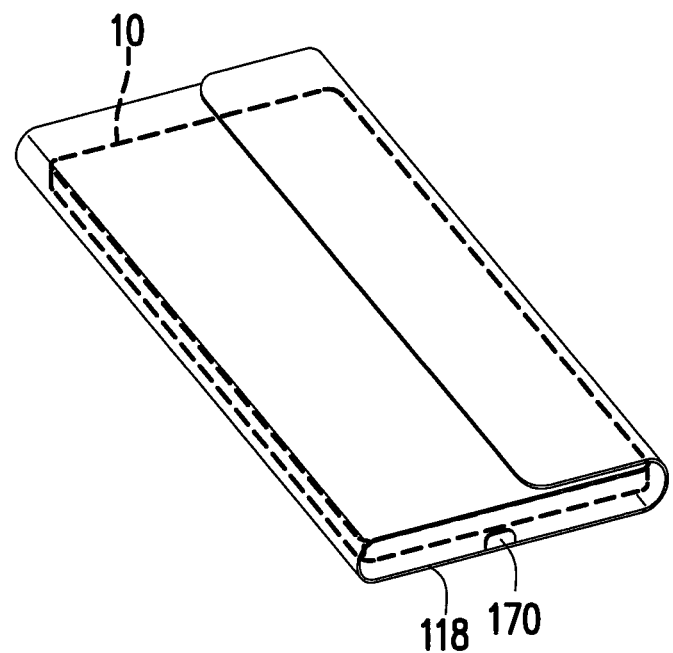
Figure 1E:
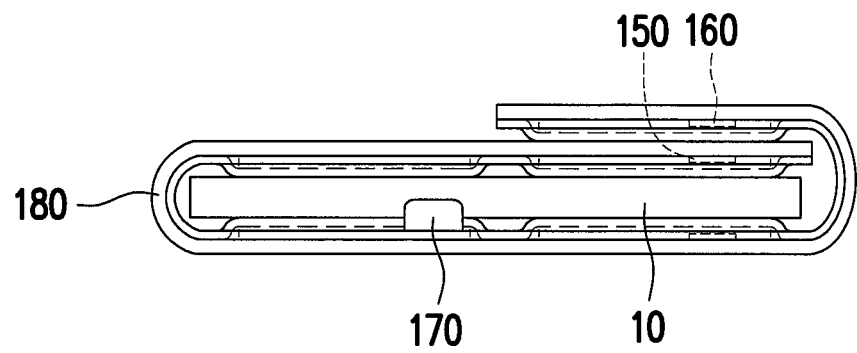
FIG. 1E is a schematic side view of a protective cover of FIG. 1A covering a tablet device.

When the protective cover 100 is expected to cover the tablet device 10, first, the tablet device 10 is disposed on the first covering part 110 (as shown in FIG. 1B). Then, the second covering part 120 covers the tablet device 10 on the first covering part 110 (as shown in FIG. 1C). Finally, the third covering part 130 covers the second covering part 120 (as shown in FIG. 1D), thereby completing covering the tablet device 10. At this time, the tablet device 10 is received in the space 180 between the first covering part 110 and the second covering part 120, and the second magnetic element 150 and the third magnetic element 160 attract each other (as shown in FIG. 1E).

In this embodiment, the first magnetic element 140 is located in the first hard domain 116 at the right of FIG. 1A, and the second magnetic element 150 is located in the second hard domain 122 at the left of FIG. 1A.

Figure 1F:
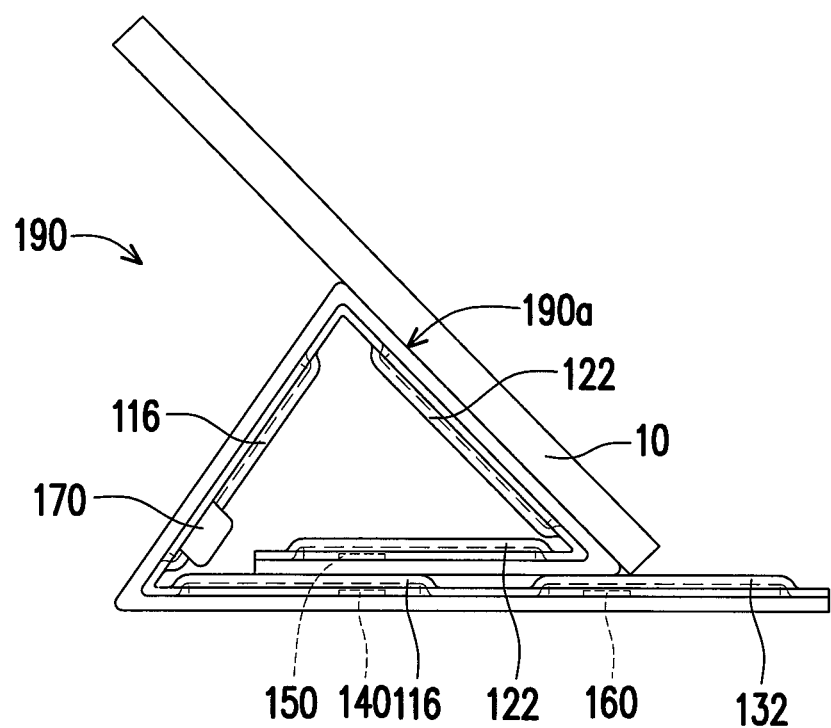
FIG. 1F is a schematic side view of a protective cover of FIG. 1A supporting a tablet device after transformation.

FIG. 1F is a schematic side view of a protective cover of FIG. 1A supporting a tablet device after transformation. Referring to FIG. 1E, when the protective cover 100 is expected to support the tablet device 10, the second hard domain 122 and the first hard domain 116 are winded from the left of FIG. 1A into a hollow triangular column 190. The first magnetic element 140 and the second magnetic element 150 attract each other, and a surface of the hollow triangular column 190 forms a bearing surface 190a to support the tablet device 10.

When the protective cover 100 covers the tablet device 10, the first hard domain 116 and the second hard domain 122 are located at two sides of the tablet device 10. The structural strength of the first hard domain 116 and the second hard domain 122 can reduce the influence of external impact on the tablet device 10. When the protective cover 100 supports the tablet device 10, owing to the structural strength, the first hard domain 116 and the second hard domain 122 may support each other to form the hollow triangular column 190, thereby supporting the tablet device 10.

In this embodiment, the first magnetic element 140 is a magnetizing unit, and the second magnetic element 150 and the third magnetic element 160 are magnetizing units or magnetized units. Definitely, the first magnetic element 140 may also be a magnetized unit, and the second magnetic element 150 and the third magnetic element 160 are magnetizing units. It is only required that the first magnetic element 140 and the second magnetic element 150 attract each other, and first magnetic element 140 and the third magnetic element 160 attract each other.

In addition, in this embodiment, a surface of the first covering part 110, the second covering part 120 or the third covering part 130 contacting the tablet device 10 is an anti-slipping surface. Therefore, when the protective cover 100 is used to support the tablet device 10, a frictional force of the anti-slipping surface can maintain the tablet device 10 at the same position, so as to prevent the tablet device 10 from slipping off and being damaged.

Figure 2:
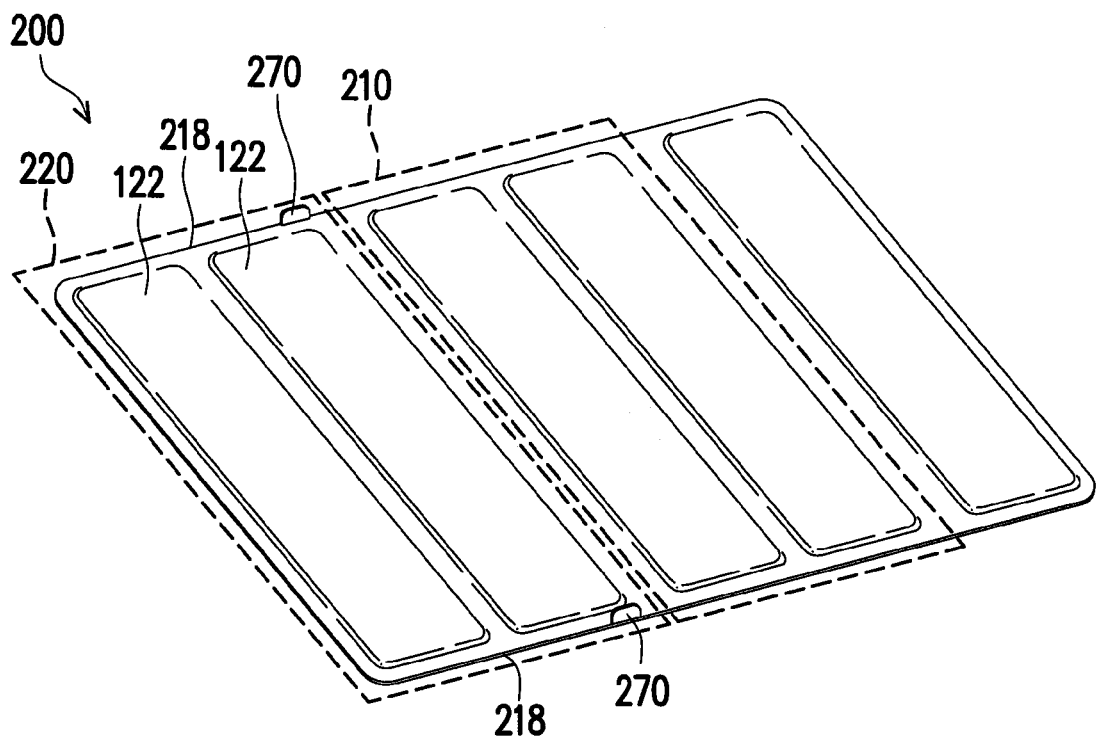
FIG. 2 is a schematic three-dimensional top view of a protective cover according to a second embodiment of the present invention.

FIG. 2 is a schematic three-dimensional top view of a protective cover according to a second embodiment of the present invention. Referring to FIG. 2, a second covering part 220 of a protective cover 200 has a pair of second profile laterals 218 opposite to each other. A plurality of barriers 270 is disposed at the pair of the second profile laterals 218, so that when the tablet device 10 is covered by the protective cover 200, the tablet device 10 can be maintained in a space between a first covering part 210 and the second covering part 220.

The difference between the protective cover 200 of FIG. 2 and the protective cover 100 of FIG. 1A lies in positions of the barriers 270 and the barriers 170. However, either the barriers 170 disposed at the first profile laterals 118 or the barriers 270 disposed at the second profile laterals 218 can limit the tablet device 10 in the protective cover 100 or 200 when the tablet device 10 is covered by the protective cover 100 or 200.

Figure 3:
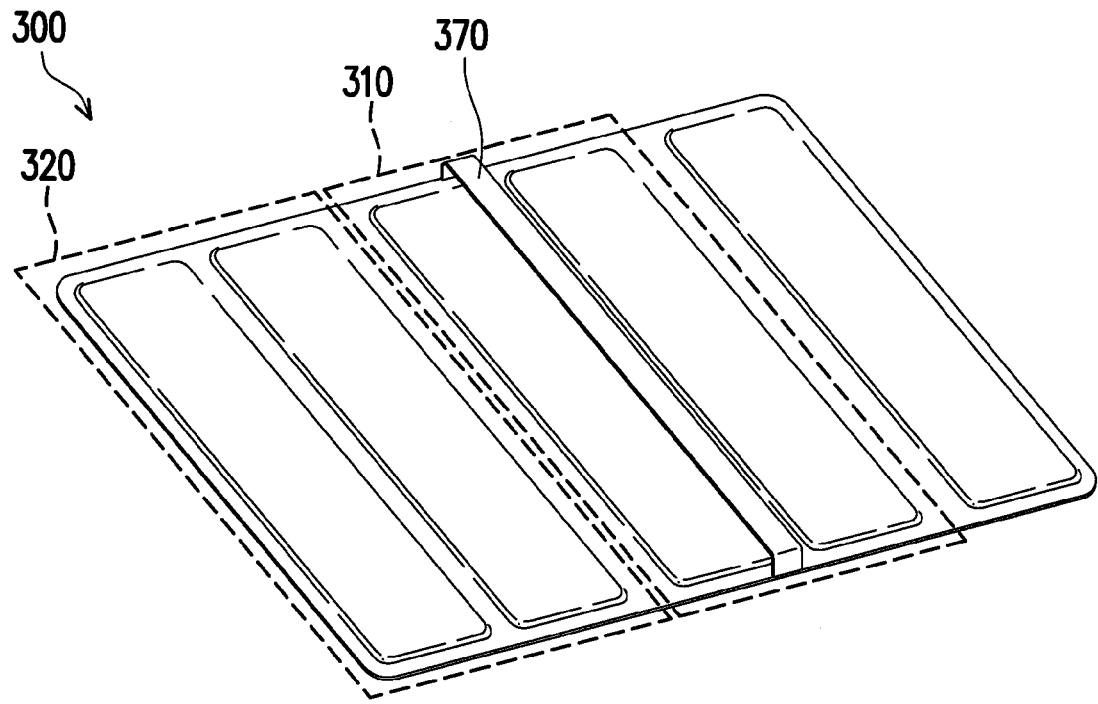
FIG. 3 is a schematic three-dimensional top view of a protective cover according to a third embodiment of the present invention.

FIG. 3 is a schematic three-dimensional top view of a protective cover according to a third embodiment of the present invention. Referring to FIG. 3, in a protective cover 300 according to this embodiment, a fixing strap 370 is used to substitute the barriers 170 of the protective cover 100 of FIG. 1A, so as to fix the tablet device 10. The fixing strap 370 is disposed at a first covering part 310 or a second covering part 320. When the protective cover 300 is used to cover the tablet device 10, the fixing strap 370 is used to limit the movement of the tablet device 10, so as to ensure that the tablet device 10 cannot escape from the protective cover 300.

The fixing strap 370 in this embodiment may be an elastic band, and the fixing strap 370 is disposed at the first covering part 310. Definitely, the type and position of the fixing strap 370 are not limited thereto.

Figure 4A:
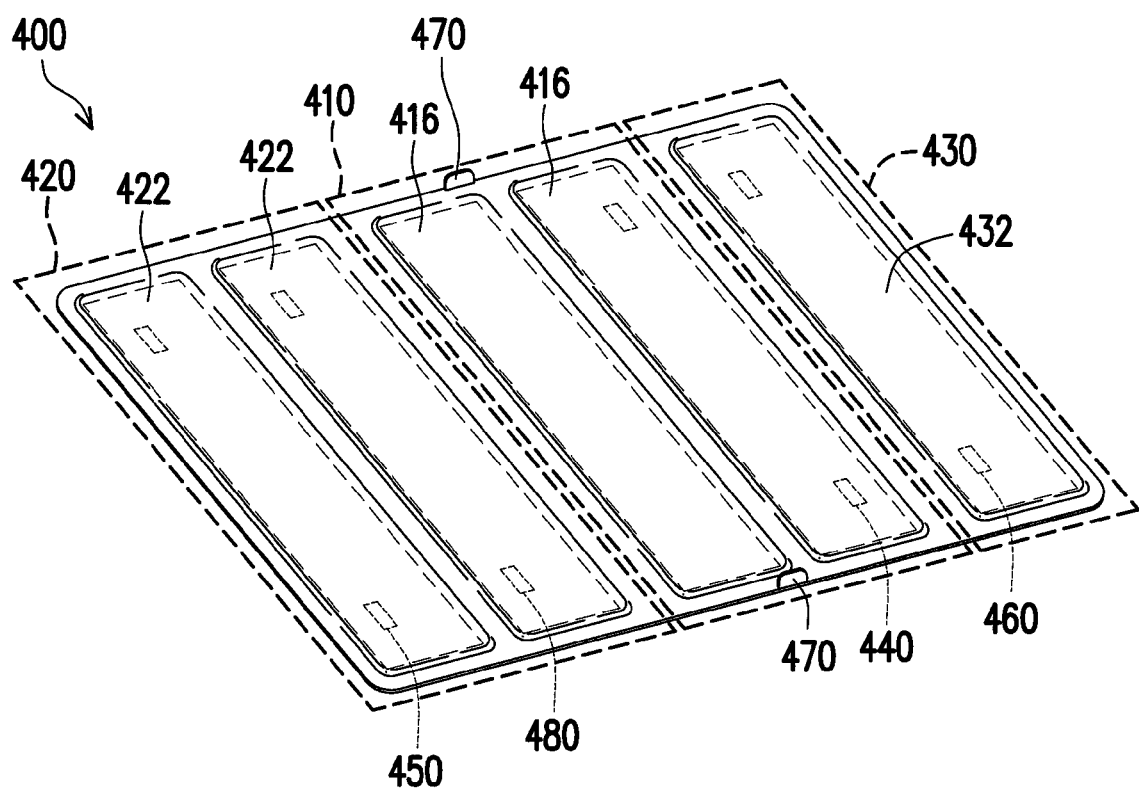
FIG. 4A is a schematic three-dimensional top view of a protective cover according to a forth embodiment of the present invention.

FIG. 4A is a schematic three-dimensional top view of a protective cover according to a forth embodiment of the present invention. Referring to FIG. 4A, the difference between a protective cover 400 of FIG. 4A and the protective cover 100 of FIG. 1A lies in that, the protective cover 400 of FIG. 4A further includes a fourth magnetic element 480. The fourth magnetic element 480 is disposed at a second covering part 420. A second magnetic element 450 and the fourth magnetic element 480 are respectively located in different second hard domains 422 of the second covering part 420.

Figure 4B:
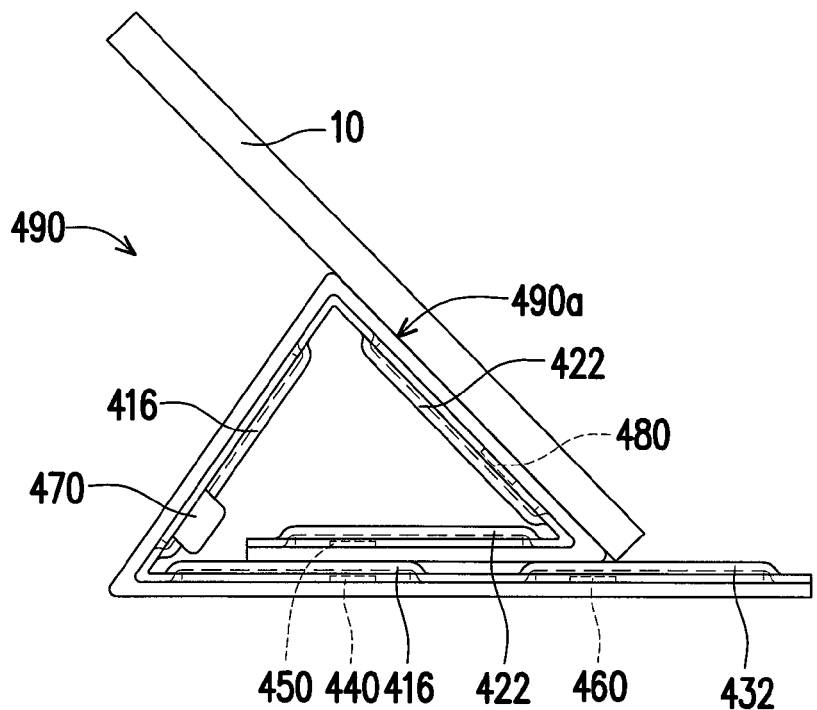
FIG. 4B to FIG. 4C are schematic side views of a protective cover of FIG. 4A supporting a tablet device after transformation.
Figure 4C:
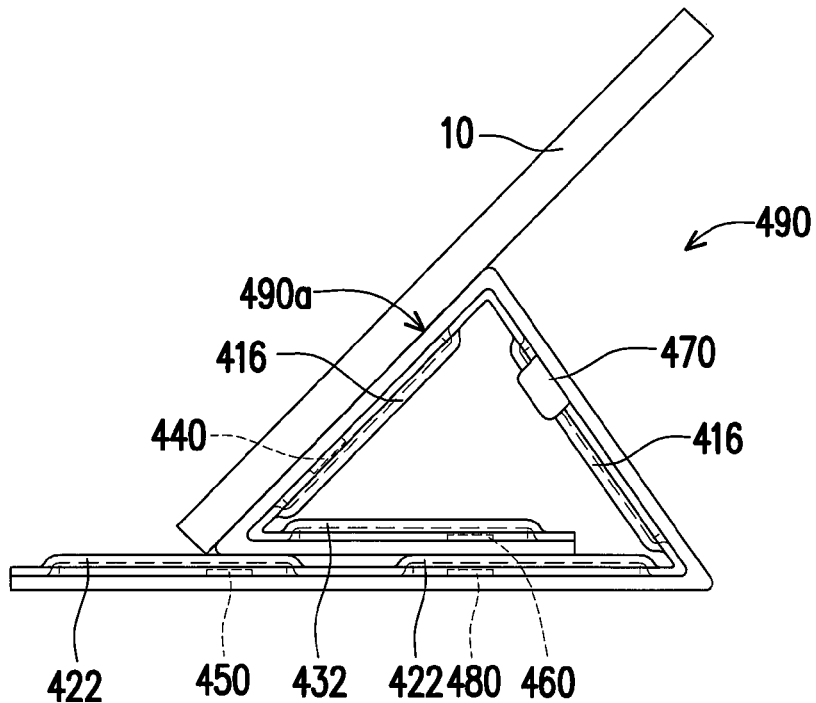

FIG. 4B to FIG. 4C are schematic side views of a protective cover of FIG. 4A supporting a tablet device after transformation. When the protective cover 400 of this embodiment is used to support the tablet device 10, as shown in FIG. 4B, the user may wind the second hard domain 422 and a first hard domain 416 into a hollow triangular column 490 from the left of the protective cover 400 in FIG. 4A. The second magnetic element 450 and the first magnetic element 440 attract each other, so that a surface of the hollow polygonal column 490 forms a bearing surface 490a to support the tablet device 10. As shown in FIG. 4C, the user may also wind a third hard domain 432 and the first hard domain 416 into a hollow polygonal column 490 from the right of the protective cover 400 in FIG. 4A. The third magnetic element 460 and the fourth magnetic element 480 attract each other. A surface of the hollow polygonal column 490 forms the bearing surface 490a to support the tablet device 10.

In other words, when using the protective cover 400 of this embodiment, the user does not need to confirm the position of the second covering part 420 or the third covering part 430 in the protective cover 400 before winding the protective cover 400 into the hollow triangular column 490 and fixing the protective cover 400. The user only needs to either wind the second hard domain 422 and the first hard domain 416 from the left of the protective cover 400 shown in FIG. 4A, or wind the third hard domain 432 and the first hard domain 416 from the right, the hollow triangular column 490 can be formed. In addition, through the attracted second magnetic element 450 and the first magnetic element 440, or the attracted third magnetic element 460 and the fourth magnetic element 480, the shape of the hollow triangular column 490 is fixed. A surface of the hollow polygonal column 490 forms the bearing surface 490a to support the tablet device 10.

Figure 5A:
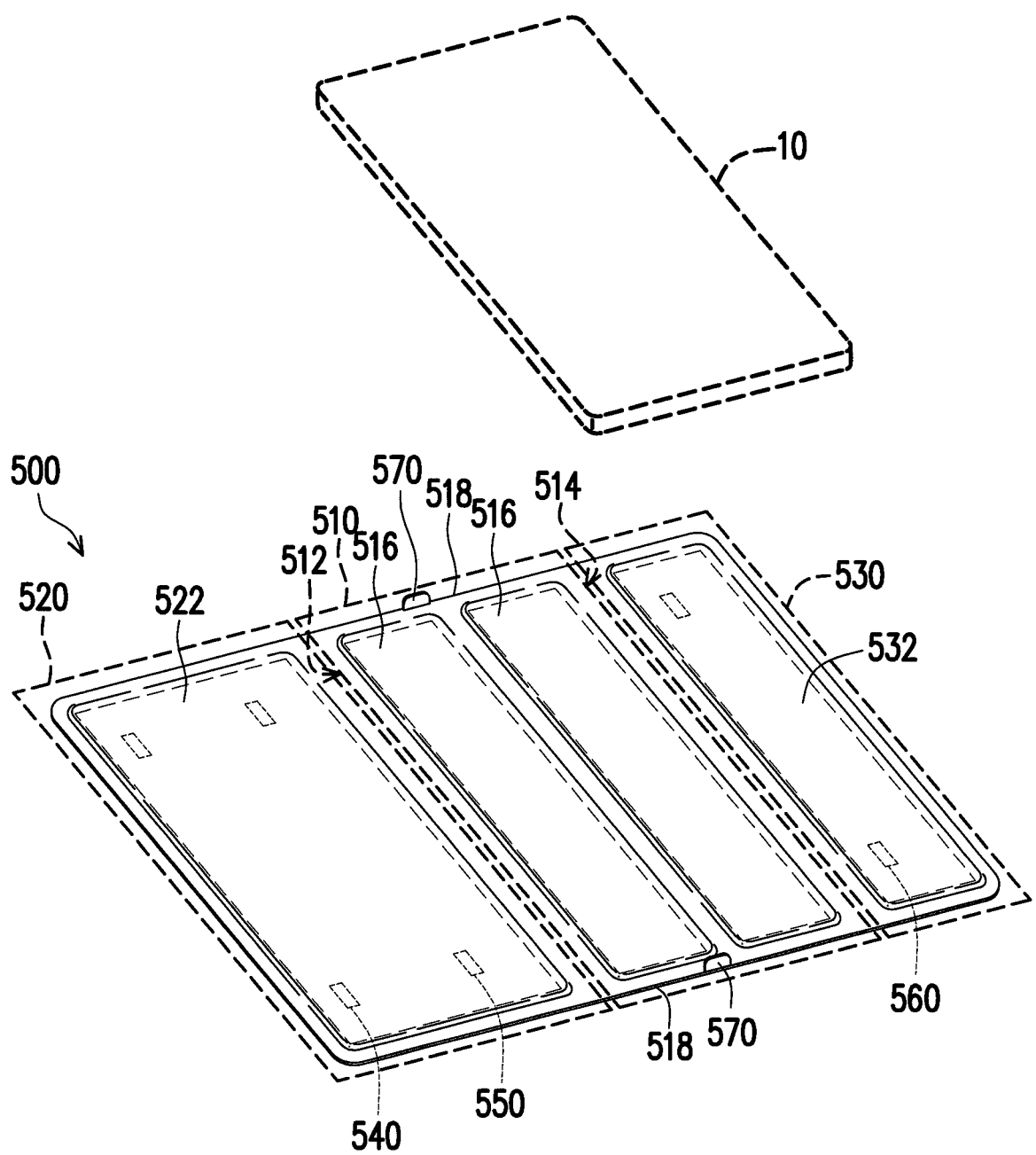
FIG. 5A to FIG. 5D are schematic three-dimensional top views of different states of a protective cover according to a fifth embodiment of the present invention.

FIG. 5A to FIG. 5D are schematic three-dimensional top views of different states of a protective cover according to a fifth embodiment of the present invention. FIG. 5E is a schematic side view of a protective cover of FIG. 5A covering a tablet device. Referring to FIG. 5A, a protective cover 500 of this embodiment includes a first covering part 510, a second covering part 520, a third covering part 530, a first magnetic element 540, a second magnetic element 550 and a third magnetic element 560.

The first covering part 510 has a first connecting lateral 512 and a second connecting lateral 514 that are opposite to each other, and a plurality of first hard domains 516, in which adjacent first hard domains 516 are connected to each other flexibly. The second covering part 520 is connected to the first connecting lateral 512 flexibly. The third covering part 530 is connected to the second connecting lateral 514 flexibly. The first magnetic element 540 is disposed at the second covering part 520. The second magnetic element 550 is disposed at the second covering part 520. The third magnetic element 560 is disposed at the third covering part 530.

In the protective cover 500 of this embodiment, the first covering part 510 and the second covering part 520 have the same width. The second covering part 520 has a second hard domain 522. The first magnetic element 540 and the second magnetic element 550 are located in the second hard domain 522. The third covering part 530 has a third hard domain 532. The third magnetic element 560 is disposed in the third hard domain 532. In this embodiment, the first hard domain 516 and the third hard domain 532 have the same width. The width of the second hard domain 522 is approximate to a sum of the widths of the first hard domains 516.

In view of FIG. 5A, the second covering part 520 only has one second hard domain 522, and an area of the second hard domain 522 is close to an area of the entire second covering part 520. When the second covering part 520 rotates towards the first covering part 510, the entire second covering part 520 in FIG. 5A rotates, which is different from that the second covering part 120 of FIG. 1A can still bend along an interval between two second hard domains 122.

In this embodiment, the first covering part 510 has a pair of first profile laterals 518 opposite to each other. A plurality of barriers 570 is disposed at the pair of the first profile laterals 518. When the protective cover 500 is used to cover the tablet device 10, the barriers 570 can limit the tablet device 10 in the protective cover 500.

In this embodiment, the third magnetic element 560 may be a magnetizing unit. The first magnetic element 540 and the second magnetic element 550 may be magnetizing units or magnetized units. Alternatively, the third magnetic element 560 may also be a magnetized unit. The first magnetic element 540 and the second magnetic element 550 may be magnetizing units.

Figure 5B:
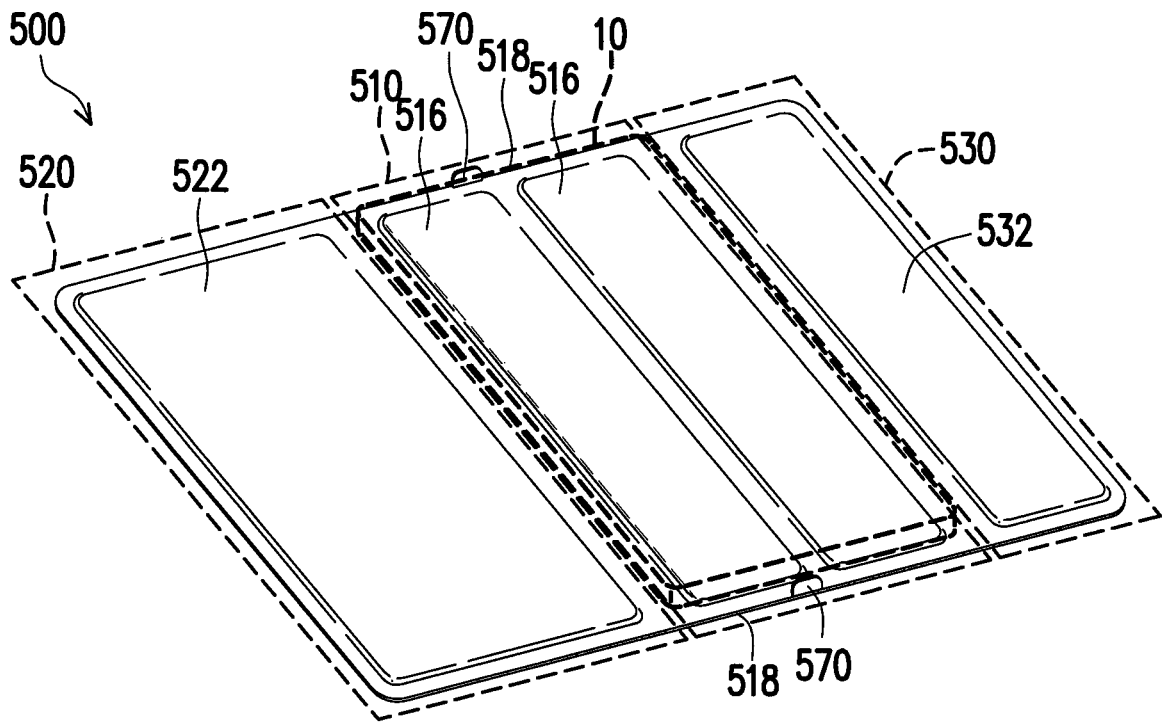
Figure 5C:
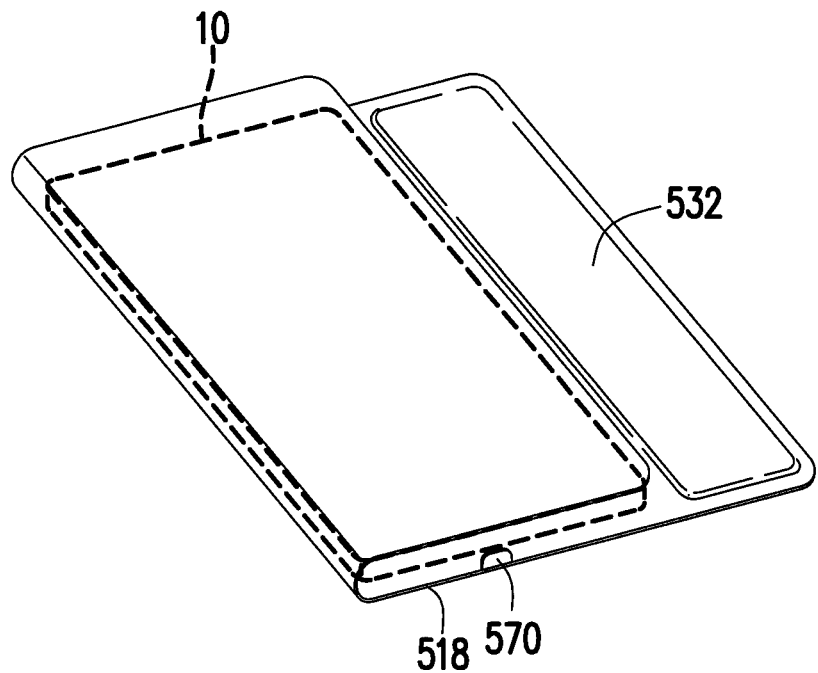
Figure 5D:
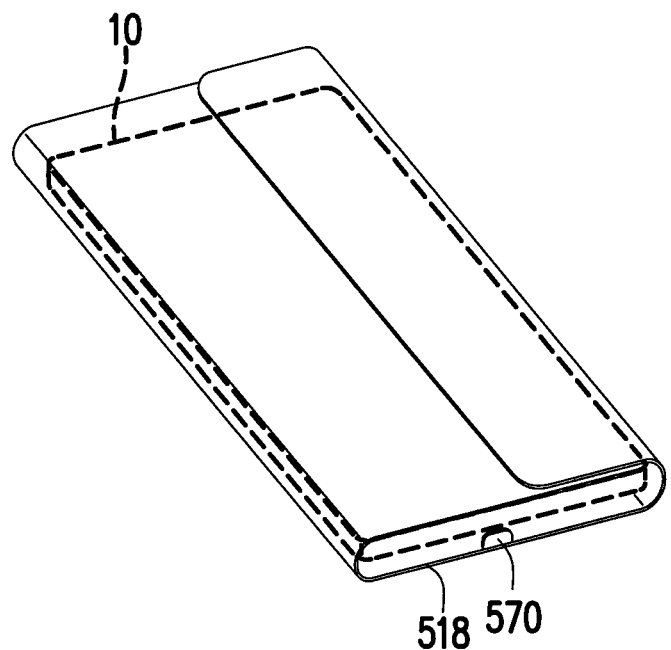
Figure 5E:
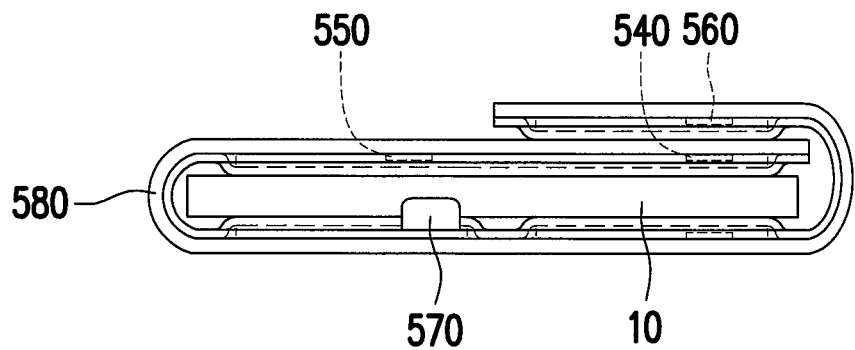
FIG. 5E is a schematic side view of a protective cover of FIG. 5A covering a tablet device.

When the protective cover 500 is expected to cover the tablet device 10, first, the tablet device 10 is disposed on the first covering part 510 (as shown in FIG. 5B). Then, the second covering part 520 covers the tablet device 10 on the first covering part 510 (as shown in FIG. 5C), so that the tablet device 10 is located in a space 580 between the first covering part 510 and the second covering part 520. Finally, the third covering part 530 covers the second covering part 520 (as shown in FIG. 5D). The third magnetic element 560 and the second magnetic 550 attract each other, and the protective cover 500 can cover the tablet device 10 (as shown in FIG. 5E).

Figure 5F:
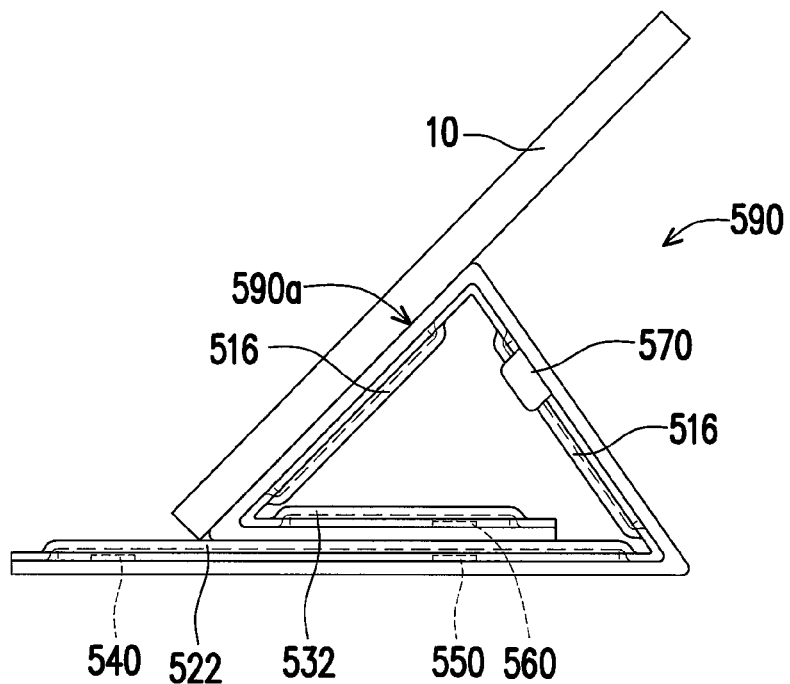
FIG. 5F is a schematic side view of a protective cover of FIG. 5A supporting a tablet device after transformation.

FIG. 5F is a schematic side view of a transformed protective cover of FIG. 5A supporting a tablet device. Referring to FIG. 5F, the third hard domain 532 and the first hard domain 516 are winded into a hollow polygonal column 590, and the third magnetic element 560 and the first magnetic element 540 attract each other to fix the shape of the hollow polygonal column 590. A surface of the hollow polygonal column 590 forms the bearing surface 590a to support the tablet device 10.

Figure 5G:
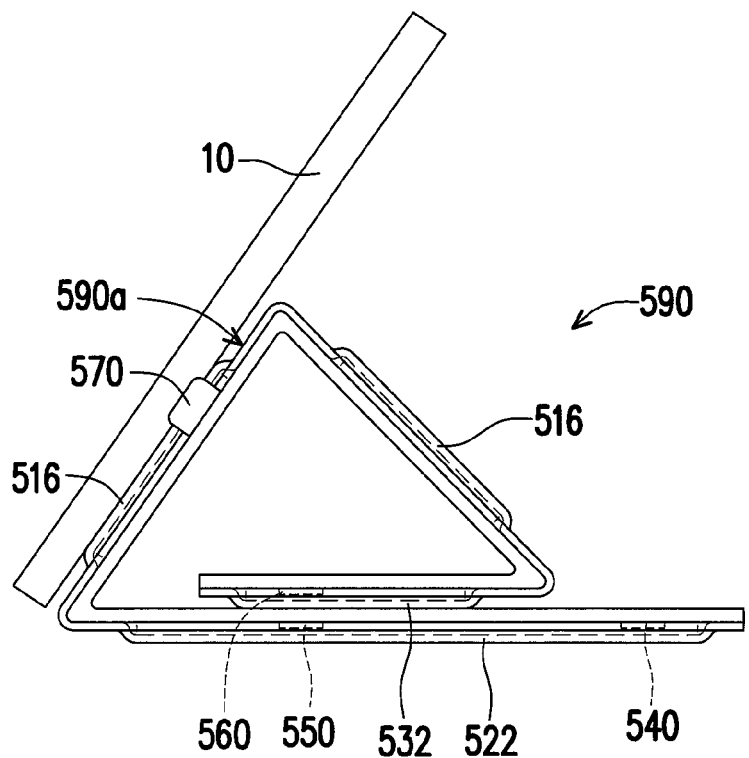
FIG. 5G is a schematic side view of a protective cover of FIG. 5A supporting a tablet device after another transformation.

FIG. 5G is a schematic side view of a protective cover of FIG. 5A supporting a tablet device after another transformation. Referring to FIG. 5G, as compared with FIG. 5F, the third hard domain 532 and the first hard domain 516 are winded into a hollow polygonal column 590 with another surface, and the third magnetic element 560 and the first magnetic element 540 attract each other to fix the shape of the hollow polygonal column 590. A surface of the hollow polygonal column 590 forms the bearing surface 590a to support the tablet device 10. In addition, the barrier 570 is located at side faces of the tablet device 10 to clamp the tablet device 10, so that the tablet device 10 may be supported more firmly. In the present invention, the protective cover adopts the covering parts to cover the tablet device, and adopts the magnetic elements to fix relative positions of these covering parts. When the protective cover of the present invention is used to support the tablet device, the hollow polygonal column is formed by winding the hard domains of the covering parts, and magnetic attraction is used to fix the shape of the hollow polygonal columns, so that a surface of the hollow polygonal column can be used as a bearing surface to support the tablet device.

Based on the above, the protective cover according to the present invention can provide efficacies of covering and protecting the tablet device, and can be easily transformed to a support to support the tablet device. The protective cover according to the present invention has advantages of easy operation and reducing the weight and size of articles carried by the user.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A protective cover, applying to cover or support a tablet device, comprising:
    a first covering part, comprising a first connecting lateral and a second connecting lateral that are opposite to each other, and a plurality of first hard domains, wherein adjacent first hard domains are connected to each other flexibly;
    a second covering part, connected to the first connecting lateral flexibly and comprising a plurality of second hard domains, wherein adjacent second hard domains are connected to each other flexibly;
    a third covering part, connected to the second connecting lateral flexibly;
    a first magnetic element, disposed at the first covering part;
    a second magnetic element, disposed at the second covering part; and
    a third magnetic element, disposed at the third covering part, wherein:
    when the second covering part covers the tablet device on the first covering part and the third covering part covers the second covering part, the first covering part and the second covering part form a space to receive the tablet device, and the third magnetic element and the second magnetic element attract each other, and
    when the second hard domain and the first hard domain are winded into a first hollow polygonal column, the first magnetic element and the second magnetic element attract each other, and a surface of the first hollow polygonal column forms a bearing surface to support the tablet device.

2. The protective cover according to claim 1, wherein the first magnetic element is a magnetizing unit, and the third magnetic element and the second magnetic element are magnetizing units or magnetized units.

3. The protective cover according to claim 1, wherein the first magnetic element is a magnetized unit, and the third magnetic element and the second magnetic element are magnetizing units.

4. The protective cover according to claim 1, further comprising:
    a fixing strap, disposed at the first covering part or the second covering part, so as to ensure that the tablet device is located in the space.

5. The protective cover according to claim 1, further comprising:
    a plurality of barriers, wherein the first covering part comprises a pair of first profile laterals opposite to each other, and the barriers are disposed at the pair of first profile laterals, so as to ensure that the tablet device is located in the space.

6. The protective cover according to claim 1, further comprising:
    a plurality of barriers, wherein the second covering part comprises a pair of second profile laterals opposite to each other, and the barriers are disposed at the pair of second profile laterals, so as to ensure that the tablet device is located in the space.

7. The protective cover according to claim 1, wherein a surface of the first covering part, the second covering part or the third covering part contacting the tablet device is an anti-slipping surface.

8. The protective cover according to claim 1, further comprising:
    a fourth magnetic element, disposed at the second covering part, wherein when the third covering part and the first hard domains are winded into a second hollow polygonal column, the third magnetic element and the fourth magnetic element attract each other, and a surface of the second hollow polygonal column foinis a bearing surface to support the tablet device.

9. The protective cover according to claim 1, wherein the first hard domain and the second hard domain have the same width.

10. The protective cover according to claim 1, wherein the third covering part comprises a third hard domain, and the first hard domain, the second hard domain and the third hard domain have the same width.

11. A protective cover, applying to cover or support a tablet device, comprising:
    a first covering part, comprising a first connecting lateral and a second connecting lateral that are opposite to each other, and a plurality of first hard domains, wherein adjacent first hard domains are connected to each other flexibly;
    a second covering part, connected to the first connecting lateral flexibly;
    a third covering part, connected to the second connecting lateral flexibly;
    a first magnetic element, disposed at the second covering part;
    a second magnetic element, disposed at the second covering part; and
    a third magnetic element, disposed at the third covering part, wherein:
    when the second covering part covers the tablet device on the first covering part and the third covering part covers the second covering part, a space exists between the first covering part and the second covering part to receive the tablet device, and the third magnetic element and the second magnetic element attract each other,
    when the third covering part and the first hard domain are winded into a first hollow polygonal column, the third magnetic element and the first magnetic element attract each other, and a surface of the first hollow polygonal column forms a bearing surface to support the tablet device.

12. The protective cover according to claim 11, wherein the third magnetic element is a magnetizing unit, and the first magnetic element and the second magnetic element are magnetizing units or magnetized units.

13. The protective cover according to claim 11, wherein the third magnetic element is a magnetized unit, and the first magnetic element and the second magnetic element are magnetizing units.

14. The protective cover according to claim 11, further comprising:
a fixing strap, disposed at the first covering part or the second covering part, so as to ensure that the tablet device is located in the space.

15. The protective cover according to claim 11, further comprising:
a plurality of barriers, wherein the first covering part comprises a pair of first profile laterals opposite to each other, and the barriers are disposed at the pair of first profile laterals, so as to ensure that the tablet device is located in the space.

16. The protective cover according to claim 11, further comprising:
a plurality of barriers, wherein the second covering part comprises a pair of second profile laterals opposite to each other, and the barriers are disposed at the pair of second profile laterals, so as to ensure that the tablet device is located in the space.

17. The protective cover according to claim 11, wherein a surface of the first covering part, the second covering part or the third covering part that contacts the tablet device is an anti-slipping surface.

18. The protective cover according to claim 11, wherein the second covering part comprises a second hard domain, and the first hard domain and the second hard domain have the same width.

19. The protective cover according to claim 18, wherein the first magnetic element and the second magnetic element are located in the second hard domain.

20. The protective cover according to claim 11, further comprising:
a fourth magnetic element, located at the first covering part, and the second covering part comprises a plurality of second hard domains, the first magnetic element and the second magnetic element are respectively located at different second hard domains, when the second hard domains and the first hard domain are winded into a second hollow polygonal column, the second magnetic element and the fourth magnetic element attract each other, and a surface of the second hollow polygonal column forms a bearing surface to bear the tablet device.

21. The protective cover according to claim 20, wherein the first hard domain and the second had domain have the same width.

22. The protective cover according to claim 20, wherein the third covering part comprises a third hard domain, and the first hard domain, the second hard domain and the third hard domain have the same width.

* * * * *